SIGNAL DETECTING AND AMPLIFYING CIRCUIT
UTILIZING A SATURABLE CORE
Filed Sept. 15, 1961

*INVENTOR.*
RICHARD S. BURWEN
*BY*
Arthur H. Swanson
ATTORNEY.

3,210,689
Patented Oct. 5, 1965

3,210,689

SIGNAL DETECTING AND AMPLIFYING CIRCUIT UTILIZING A SATURABLE CORE

Richard S. Burwen, Lexington, Mass., assignor to Honeywell Inc., a corporation of Delaware Filed Sept. 15, 1961, Ser. No. 138,312
5 Claims. (Cl. 331—113)

The invention relates to electronic apparatus and more particularly to an electronic amplification circuit featuring a magnetic input means.

It is an object of the present invention to provide an improved signal detecting and amplifying circuit.

It is another object of this invention to provide an improved detecting and amplification circuit as set forth characterized in that a wide range of input signals may be accommodated, from direct or unidirectional signals to relatively higher frequency alternating signals.

It is a further object of this invention to provide detecting and amplification system as set forth wherein the input signal is magnetically coupled to control the operation of the circuit.

A still further object of the present invention is to provide an improved magnetometer.

It is yet another object of this invention to provide an improved amplification circuit as set forth for a wide range of input signals yet providing isolation between the input and output circuitry.

In accomplishing these and other objects there has been provided in accordance with the present invention a transistor circuit which is selfexcited to an oscillatory operation, producing a signal which in the absence of an input signal, is a symmetrical square-wave. The input circuit includes a magnetically saturable element which responds in one case, to an external magnetic field and in the other case, to an applied input signal. In either case, the external signal causes a disruption in the symmetry of the square-wave signal, and the asymmetry of the resulting signal is proportional to the magnitude of the input signal. The resulting square-wave signals are applied to a low pass filter or averaging circuit. This produces a signal which corresponds to the input signal which produce the aforesaid asymmetry.

Figure 1:
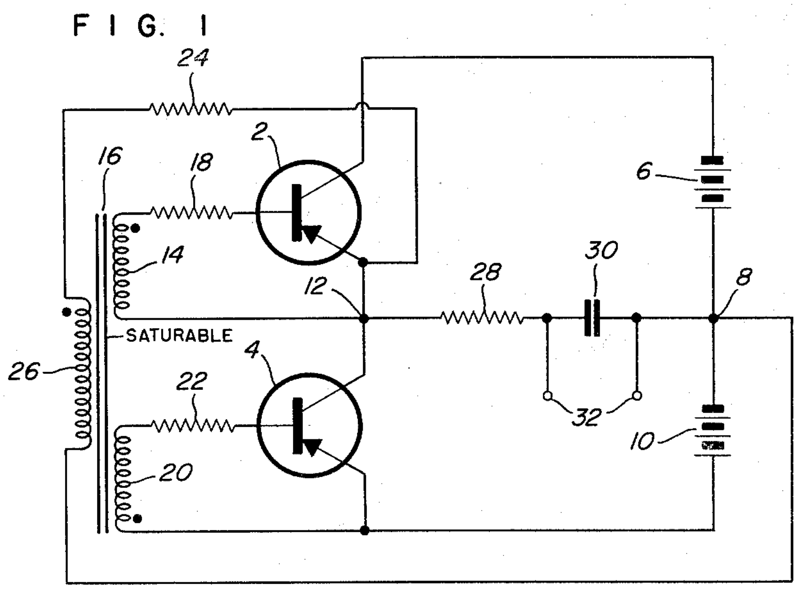
Figure 2:
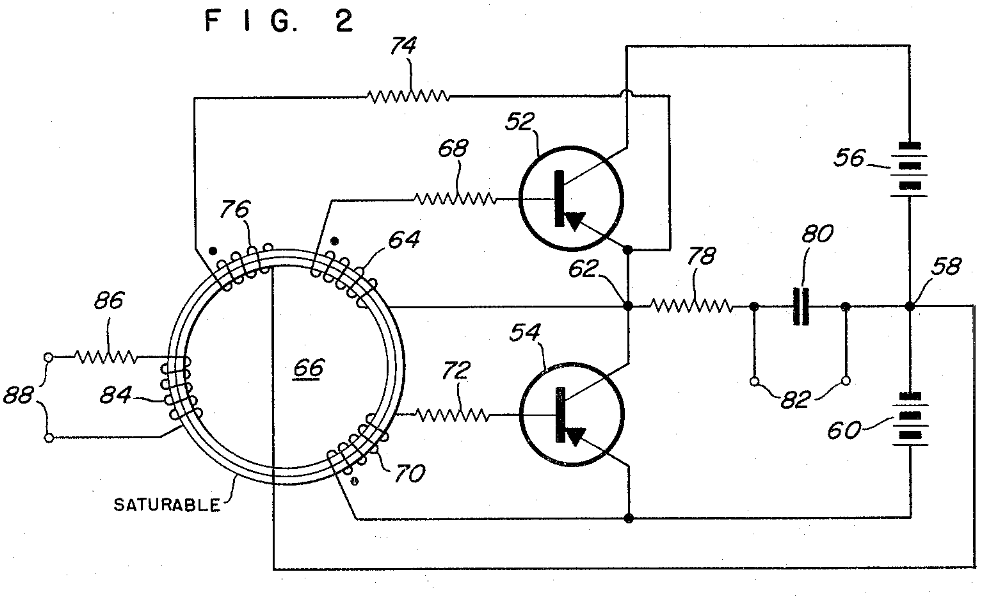

A better understanding of this invention may be had from the following detailed description when read in connection with the accompanied drawings, in which:

FIG. 1 is a schematic diagram of a circuit embodying in the present invention and incorporated in a magnetometer, and FIG. 2 is a schematic diagram of a circuit embodying the present invention and incorporated in an amplifier for input signals.

Referring now to the drawing in more detail there is shown in FIG. 1 a first transistor 2 and a second transistor 4. The emitter of the first transistor 2 is directly connected to the collector of the second transistor 4. The collector of the first transistor 2 is connected to the negative terminal of a suitable power supply represented by the battery 6. The positive terminal of the battery 6 is connected to a common junction 8. The emitter of the second transistor 4 is connected to the positive terminal of a suitable power supply represented by the battery 10. The negative terminal of the battery 10 is also connected to the common junction 8.

The direct connection between the emitter of the first transistor 2 and the collector of the second transistor 4 includes a second common junction 12. From this junction 12 a connection is made through a first secondary winding 14 on a saturable transformer 16, through a series resistor 18 to the base of the first transistor 2. A similar connection is made from the emitter of the second transistor 4 through a second secondary winding 20 on the saturable transformer 16, through a series resistor 22 to the base of the second transistor 4. Also from the common junction 12 a connection is made through a series resistor 24 through a primary winding 26 on the transformer 16 to the first mentioned common junction 8. An output circuit is also connected between the common junction 12 and the common junction 8. This output circuit includes a low pass filter comprising a series resistor 28 and a capacitor 30. A pair of output terminals 32 are connected across the capacitor 30.

With the application of power to the foregoing circuit from the power supply represented by the batteries 6 and 10, one or the other of the two transistors 2 and 4 will begin to conduct first. For the purpose of this discussion let it be assumed that the first transistor 2 is the first to begin conducting. A conduction path including the first transistor 2 is as follows:

From the collector of the transistor 2 through the battery 6 to the junction 8, from the junction 8 through the primary winding 26 of the transformer 16, through the resistor 24 to the emitter of the transistor 2 at the common junction 12. Current through the primary winding 26 of the transformer 16 induces a current in the secondary winding 14 of the transformer. The windings on the transformer are so arranged that the polarity of the signal at the upper end of the secondary winding 14 is the same as the polarity at the upper end of the primary winding 26. While the polarity at the upper end of the secondary winding 20 is the opposite of that in either the primary winding 26 or the first mentioned secondary winding 14. With this arrangement, the signal induced in the secondary winding 14 as a result of the current flowing through the transistor 2 is in such a direction as to increase the current flow through the transistor 2. At the same time, a signal is induced in the secondary winding 20 associated with the second transistor 4 in such a direction as to inhibit current flow through the transistor 4. The increase in current through the transistor 2 again causes a further increase in the current through the primary winding 26 of the transformer 16. This positive feedback signal continues until the current in the primary winding 26 is of sufficient magnitude to cause the core of the transformer 16 to become saturated. As the core enters the saturation condition the induced field in the secondary winding 14 diminishes, thereby diminishing the current through the winding 26. The positive feedback nature of the connection between the transistors and the winding 26 is such that the diminishing current in the winding 26 continues until the direction of the current reverses.

The diminishing and reversal of current in the primary winding 26 causes a change in the direction of the induced signals in both of the secondary windings 14 and 20, resulting in an extinguishing of the conduction of the transistor 2 and exciting the transistor 4 into conduction. When the transistor 4 is conducting a condutcion path is provided from the positive terminal of the battery 10 through the transistor 4 to the junction 12, from the junction 12 through the resistor 24 and the primary winding 26 to the junction 8, and back to the negative terminal of the battery 10. It will be noted that this produces a reversal in the direction of current flow through the primary winding 26 as compared with the condition when the first transistor 2 was conducting. Again, the current flow through the transformer primary winding 26 causes a further increase in the conductivity of the transistor 4 which, in turn, further increases the current flow through the primary winding 26 until the core of the transformer 16 has again saturated, whereupon the situation is again reversed.

While, for purposes of this description the increases, decreases and reversals of the current through the two transistors has been described as a progressive arrangement, it will be appreciated that because of the nature of the saturable core and the operating characteristics of the transistors that the reversals in the current flow relationship present substantially a snap action, producing a substantially square-wave signal at the junction 12. In the absence of a disturbing magnetic field influencing the core of the transformer 16, this square-wave will be symmetrical with respect to the zero axis. Further, the repetition rate of this square-wave signal is determined by the *L/R* time-constant of the feedback network.

The square-wave signal appears between the junction 12 and the junction 8. This signal is applied to the averaging circuit or low pass filter including the resistor 28 and the capacitor 30, producing a direct current signal across the output terminals 32 which is the average of the magnitude of the positive and negative portions of the square-wave. As thus far described, the square-wave is symmetrical, then the average signal across the output terminals 32 is zero.

In he form of the invention shown in this figure, the core of the transformer 16 is represented as a straight bar of magnetically saturable material. As such, the core member may be aligned with and influenced by an external magnetic field. Such an external magnetic field applies a magnetic bias to the core. Thus biased, since the external magnetic field will be of one polarity or the other with respect to the core member of the transformer 16. It is apparent that the core member may be driven into saturation by the current in the primary winding 26 earlier in one direction than in the other depending upon the polarity of the applied external magnetic field. This, in turn, causes one portion of the square-wave to be longer in time duration than the other, that is the square-wave is no longer symmetrical about the zero axis. This asymmetry, when applied across the output circuit, produces a net D.C. signal across the output terminal 32 which is of a polarity determined by polarity of the applied external field and of a magnitude determined by the magnitude of the field. As an example let it be assumed that an external field is such as to cause the positive portions of the square-wave signal to be greater than the negative portion of the square-wave signal. Under these conditions the average or net signal appearing across the output terminal 32 will be a positive signal. If, now, the core of the transformer 16 is turned end-for-end with respect to the external magnetic field the net result will be that the negative portions of the square-wave signal will be greater than the positive portion. This, then, produces a net or average negative signal across the output terminal 32. Thus we may see that the polarity of the output signal is determined by or indicative of the polarity of the external field with respect to the core of the transformer 16. The degree or extent of the asymmetry of the square-wave signal will be directly proportional to the relative magnitude of the external field as it is applied to the core of the transformer 16. The net or average signal appearing across the output terminal 32 is a function of the extent of the asymmetry of the square-wave. Hence, the magnitude of the net signal appearing across the output terminal 32 is indicative of the field strength or magnitude of the externally applied magnetic field. Thus the structure set forth in FIGURE 1 constitutes a very simple but highly accurate and very sensitive magnetometer.

In FIGURE 2 there has been shown a circuit which is substantially identical to that shown in FIGURE 1 with the exception of the input circuitry. Again there is shown a first transistor 52 and a second transistor 54. The collector of the first transistor 52 is connected to the negative terminal of a suitable power supply represented by the battery 56. The positive terminal of the battery 56 is connected to a common junction 58. The emitter of the second transistor 54 is connected to the positive terminal of a suitable power supply represented by a battery 60. The negative terminal of this battery is also connected to the common junction 58. The emitter of the first transistor 52 is directly connected to the collector of the second transistor 54 and to a second common junction 62. A connection is made from the common junction 62 through a secondary winding 64 of a saturable transformer 66, through a series resistor 68 to the base of the first transistor 52. A similar connection is made from the emitter of the second transistor 54 through a second secondary winding 70 on the saturable transformer 66 through a series resistor 72 to the base of the second transistor 54. From the common junction 62, a feedback connection is made through a series resistor 74 and a primary winding 76 on the transformer 66 to the common junction 58. Again, an output circuit is connected between the common junction 62 and the common junction 58. This output circuit includes a low pass filter or averaging circuit including a series resistor 78 and a capacitor 80. A pair of output terminals 82 are connected across the capacitor 80. Whereas in FIGURE 1 the transformer was indicated as having a straight bar saturable core member, in FIGURE 2, the transformer is in the form of a toroid. Further, to it is added an input winding 84 connected through a series resistor 86 to a pair of input terminals 88.

In the absence of an input signal, applied to the terminals 88 of the input winding 84 of the transformer 66, this circuit operates in a manner identical to that of the circuit shown in FIGURE 1. With the application of power from the batteries 56 and 60 the circuit breaks into oscillation in a manner described in connection with the circuit of FIGURE 1 producing a symmetrical square-wave at the junction 62. So long as the square-wave signal at the junction 62 is symmetrical there will be no net signal appearing at the output terminals 82. When an input signal is applied to the input terminals 88, current flows in the winding 84 producing a magnetic flux in the core of the transformer 66. This flux unbalances the operation of the circuit in a manner similar to that of the externally applied field of the transformer 16 in FIGURE 1. This results in the signal appearing at the junction 62 being an asymmetrical square-wave with the asymmetry being directly proportional to the magnitude of the signal applied at the terminal 88. Further, the direction of the asymmetry is dependent upon the polarity of the signal applied at the input terminal 88. Here again when the asymmetrical square-wave signal is applied to the output circuit, including the low pass filter, there is produced a signal at the output terminals 82 which is an amplified replica of the input signal applied at the input terminals 88.

In the structure shown in FIGURE 1, the signal to be detected and amplified was that of an external magnetic field. Accordingly, the core member of the transformer 16 was shown in a straight bar configuration. The circuit of FIGURE 2, however, is designed to detect and amplify electrical signals applied to the input terminals 88. With this in mind, it may seem that responsiveness to an external magnetic field would produce an erroneous output signal at the output terminal 82. Accordingly, in order to avoid a responsiveness to external magnetic field the core of the transformer 66 is toroidal in nature whereby the effect of external magnetic fields is cancelled in the magnetic structure.

In one structure constructed in accordance with the present invention the parameters of the circuit was such that the oscillating frequency of the amplifier was about 40,000 cycles per second. Therefore not only will the amplifier thus constructed give a faithful reproduction of unidirectional input signal applied to the terminals 88, but, by carefully designing the low pass filter in the output circuit to have a sharp cutoff characteristic approximating that of the oscillatory frequency of the amplifier, an alternating signal of a frequency approaching that of the oscillatory frequency of the amplifier may be applied to the input terminal 88 and the faithfully reproduced, in amplified form, at the output terminals 82. It may further be seen that although this amplifier is capable of faithfully amplifying low frequency or direct current signals applied to the input terminals 88, there is no necessity for feedback connections between the output terminals 82 and the input terminals 88. Accordingly, there is no conductive electrical path between the input terminals and the output terminals, i.e. the output is isolated, conductively, from the input.

Thus it may be seen that there has been provided, in accordance with the present invention, an improved signal detecting and amplifying circuit wherein the input is magnetically coupled to the circuit, said circuit being adapted to perform either as a high accuracy, highly sensitive magnetometer or as a simple but accurate amplifier for a wide frequency range of signals including unidirectional or direct current signals.

What is claimed is:

1. An electronic circuit comprising a first and a second transistor each having an input means, a transformer having a saturable core and a primary winding thereon, a first unidirectional current path including said primary winding and said first transistor, a second unidirectional current path including said primary winding and said second transistor, a first secondary winding on said saturable core connected to said input means of said first transistor to control the operation of said first transistor, a second secondary winding on said saturable core connected to said input means of said second transistor to control the operation of said second transistor, said circuit being operative to produce a substantially square-wave signal the asymmetry of which is proportional to an applied input signal, and output circuit means including means for averaging said square-wave signal connected across said primary winding.

2. A self-oscillating electronic circuit comprising a first and a second transistor, each of said transistors having a collector, an emitter and a base, a transformer having a saturable core and a primary winding thereon, said emitter of said first transistor being directly connected to said collector of said second transistor and to a first common junction, a control circuit for said first transistor connected between said emitter and said base of said first transistor and including a first secondary winding on said saturable core of said transformer, a control circuit for said second transistor connected between said emitter and said base of said second transistor and including a secondary winding on said saturable core of said transformer, said second secondary winding being oppositely phased from said first secondary winding with respect to magnetic flux in said core, a first and a second unidirectional energy source serially connected between said collector of said first transistor and said emitter of said second transistor, a second common junction intermediate said first and second energy source, a positive feedback connection including said primary winding connected in a direct current conductive path between said first common junction and said second common junction whereby to produce said self-oscillation in said circuit to produce a normally symmetrical square-wave signal, said saturable core of said transformer being responsive to an applied magnetic force to unbalance the oscillating operation of said circuit to produce an asymmetrical square-wave signal the asymmetry of which is proportional to the applied magnetic force and a signal averaging output circuit connected between said first and second common junctions.

3. A self-oscillating electronic magnetometer circuit comprising a first and a second transistor, each of said transistors having a collector, an emitter and a base, a transformer having a straight bar saturable core and a primary winding thereon, said emitter of said first transistor being directly connected to said collector of said second transistor and to a first common junction, a control circuit for said first transistor connected between said emitter and said base of said first transistor and including a first secondary winding on said saturable core of said transformer, a control circuit for said second transistor connected between said emitter and said base of said second transistor and including a second secondary winding on said saturable core of said transformer, said second secondary winding being oppositely phased from said first secondary winding with respect to magnetic flux in said core, a first and a second unidirectional energy source serially connected between said collector of said first transistor and said emitter of said second transistor, a second common junction intermediate said first and second energy source, a positive feedback connection including said primary winding connected in a direct current conductive path between said first common junction and said second common junction whereby to produce said self-oscillation in said circuit to produce a normally symmetrical square-wave signal, said straight bar saturable core of said transformer being responsive to external magnetic fields to unbalance the oscillating operation of said circuit to produce an asymmetrical square-wave signal the asymmetry of which is proportional to the strength of said magnetic field, and a signal averaging output circuit connected between said first and second common junctions.

4. A self-oscillating amplifier circuit comprising a first and a second transistor, each of said transistors having a collector, an emitter and a base, a transformer having a toroidal magnetically saturable core and having a primary winding thereon, said emitter of said first transistor being directly connected to said collector of said second transistor and a first common junction, a control circuit for said first transistor connected between said emitter and said base of said first transistor and including a first secondary winding on said saturable core of said transformer, a control circuit for said second transistor connected between said emitter and said base of said second transistor and including a second secondary winding on said saturable core of said transformer, said second secondary winding being oppositely phased from said first secondary winding with respect to magnetic flux in said core, a first and a second energy source serially connected between said collector of said first transistor and said emitter of said second transistor, a second common junction intermediate said first and second energy source, a positive feedback connection including said primary winding connected in a direct current conductive path between said first common junction and said second common junction whereby to produce said self-oscillation in said circuit to produce a normally symmetrical square-wave signal, an input circuit including a signal input winding on said saturable core, said saturable core being responsive to magnetic flux produced by signals in said input winding to unbalance the operation of said circuit to produce an asymmetrical square-wave signal the asymmetry of which is proportional to the magnitude of the input signal, and a signal averaging output circuit connected between said first and second common junctions.

5. An electronic circuit comprising a first and a second transistor each having an input means; a first and a second unidirectional energy source; a transformer having a saturable core and a primary winding thereon; a first unidirectional current path including said primary winding, said first transistor, and said first unidirectional energy source; a second unidirectional current path including said primary winding, said second transistor and said second unidirectional source; a first secondary winding on said saturable core connected to said input means of said first transistor to control the operation of said first transistor; a second secondary winding on said saturable core connected to said input means of said second transistor to control the operation of said second transistor; said circuit being operative to produce a substantially square-wave signal the asymmetry of which is proportional to an applied input signal; and output circuit means including means for averaging said square-wave signal connected across said primary winding.

References Cited by the Examiner

UNITED STATES PATENTS

| | | | |
|---|---|---|---|
| 2,883,539 | 4/59 | Bruck et al. | 331—114 |
| 2,987,681 | 6/61 | Buck | 331—113 |
| 2,994,839 | 8/61 | Norton | 331—113 |
| 3,054,066 | 9/62 | Crane | 330—24 X |
| 3,115,582 | 12/63 | Yoshii et al. | 330—74 X |

OTHER REFERENCES

Sherin: Transfluxor Oscillator, Electronics, Mar. 4, 1960, pp. 48–49.

Technical Manual, MT 11–690, Dept. of The Army, Basic Theory and Application of Transistors, March 1959, pp. 18–186.

ROY LAKE, *Primary Examiner.*

ARTHUR GAUSS, NATHAN KAUFMAN, *Examiners.*